US010597896B1

(12) United States Patent
Hamilton et al.

(10) Patent No.: US 10,597,896 B1
(45) Date of Patent: Mar. 24, 2020

(54) TENT LIGHTING ASSEMBLY FOR GROWING PLANTS

(71) Applicant: Gualala Robotics, Inc., Steamboat Springs, CO (US)

(72) Inventors: Nancy Hamilton, Steamboat Springs, CO (US); James Hamilton, Steamboat Springs, CO (US)

(73) Assignee: Gualala Robotics, Inc., Steamboat Springs, CO (US)

( * ) Notice: Subject to any disclaimer, the term of this patent is extended or adjusted under 35 U.S.C. 154(b) by 101 days.

(21) Appl. No.: 16/011,307

(22) Filed: Jun. 18, 2018

Related U.S. Application Data

(60) Provisional application No. 62/522,912, filed on Jun. 21, 2017.

(51) Int. Cl.
*E04H 15/10* (2006.01)
*E04H 15/18* (2006.01)
*A01G 9/24* (2006.01)
*F21V 21/34* (2006.01)

(52) U.S. Cl.
CPC ............ *E04H 15/10* (2013.01); *A01G 9/249* (2019.05); *E04H 15/18* (2013.01); *F21V 21/34* (2013.01); *Y02A 40/256* (2018.01)

(58) Field of Classification Search
CPC ....... E04H 15/10; E04H 15/18; Y02A 40/256; A01G 9/249
USPC .......................................................... 104/91
See application file for complete search history.

(56) References Cited

U.S. PATENT DOCUMENTS

| 1,617,028 | A | * | 2/1927 | Rekar | ...................... | A61N 5/06 |
| | | | | | | 248/323 |
| 2,333,915 | A | | 11/1943 | Budd | | |
| 2,905,806 | A | * | 9/1959 | Tunney | ..................... | B66C 7/04 |
| | | | | | | 362/459 |
| 3,812,616 | A | | 5/1974 | Koziol | | |
| 3,882,306 | A | * | 5/1975 | Armstrong | ............... | A01G 9/26 |
| | | | | | | 362/427 |

(Continued)

FOREIGN PATENT DOCUMENTS

| FR | 2401095 A | * | 4/1979 | ............... B66F 19/00 |
| WO | WO-02089559 A2 | * | 11/2002 | ............... A01G 9/26 |

(Continued)

*Primary Examiner* — Robert Canfield
(74) *Attorney, Agent, or Firm* — Patterson Intellectual Property Law, P.C.; Ryan D. Levy; Mark A. Kilgore (57) ABSTRACT

A tent lighting assembly may include a main light mover grow tent having a main tent roof section, a main grow lamp translatably suspended therefrom, and a drive motor to translate the main grow lamp. A first auxiliary light mover grow tent may include a first auxiliary tent roof section and a first auxiliary grow lamp translatably suspended therefrom. A first elongate rigid member may connect the main grow lamp to the first auxiliary grow lamp such that the first auxiliary grow lamp translates with the main grow lamp. A second auxiliary light mover grow tent may also include a second auxiliary tent roof section and a second auxiliary grow lamp translatably suspended therefrom. A second elongate rigid member may connect the main grow lamp to the second auxiliary grow lamp such that the second auxiliary grow lamp translates with the main grow lamp.

19 Claims, 7 Drawing Sheets

(56) References Cited

U.S. PATENT DOCUMENTS

| | | | | |
|---|---|---|---|---|
| 4,292,762 | A | * | 10/1981 | Fogg ...................... A01G 9/246 47/17 |
| 4,932,158 | A | * | 6/1990 | Roberts ................ A01G 31/047 47/64 |
| 5,419,260 | A | * | 5/1995 | Hamilton .................. B61B 3/02 104/89 |
| 6,312,139 | B1 | * | 11/2001 | Baker ...................... A01G 9/26 362/145 |
| 7,823,324 | B2 | | 11/2010 | Townsley |
| 2006/0032115 | A1 | * | 2/2006 | Van Den Dool ...... A01G 7/045 47/17 |
| 2009/0272030 | A1 | * | 11/2009 | van den Dool ......... F21V 19/04 47/17 |
| 2013/0205663 | A1 | * | 8/2013 | Topping .................. A01G 9/20 47/66.6 |
| 2013/0258684 | A1 | * | 10/2013 | Yang ........................ A01G 9/26 362/386 |
| 2017/0291616 | A1 | * | 10/2017 | Carpenter .............. A01G 22/00 |

FOREIGN PATENT DOCUMENTS

| | | | | |
|---|---|---|---|---|
| WO | WO-2005033580 | A1 | * | 4/2005 ............. F21V 21/34 |
| WO | WO-2011135576 | A2 | * | 11/2011 ................ A01G 9/26 |

* cited by examiner

TENT LIGHTING ASSEMBLY FOR GROWING PLANTS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: U.S. Provisional Application No. 62/522,912

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to a system for growing plants indoors. More particularly, the present disclosure pertains to a tent lighting assembly.

In many situations, it can be impractical and overly expensive for an individual to construct and maintain a field or greenhouse outdoors. It is often desirable, therefore, to raise plants indoors. Often times, the plants may require a controlled environment with regard to factors such as humidity, temperature, and light exposure.

Indoor greenhouses and growing tents are known in the art. It is common for a user to upgrade their growing system by removing the previous growing tent and installing a larger growing tent. This process can involve excessive disassembly and reassembly. Furthermore, a user may wish to spread the cost of upgrading their growing system out over time.

What is needed, therefore, is a system that is capable of being assembled and/or disassembled in stages. The system may allow for upgrading or downgrading the growing system without completely removing the previous growing tent and installing a whole new growing tent and accompanying lighting system.

BRIEF SUMMARY OF THE INVENTION

Briefly, the present invention relates, in one optional embodiment, to a tent lighting assembly for growing plants. The tent lighting assembly may comprise a main tent, an auxiliary tent, and an elongate rigid member. The main tent may include a main tent roof section with a main grow lamp translatably suspended from the main tent roof section, and a drive motor configured to translate the main grow lamp. The first auxiliary tent may include a first auxiliary tent roof section, and a first auxiliary grow lamp translatably suspended from the first auxiliary tent roof section. The first elongate rigid member may connect the main grow lamp to the first auxiliary grow lamp such that the first auxiliary grow lamp translates with the main grow lamp.

In some optional embodiments, the tent lighting assembly may include a main tent roof section including a first rail assembly. The first auxiliary tent roof section may include a second rail assembly.

In some optional embodiments, the tent lighting assembly may include the first rail assembly being suspended from the main tent roof section. The first rail assembly may further comprise a first trolley disposed about the first rail assembly. The first trolley may include at least one wheel contacting the first rail assembly allowing the first trolley to traverse the first rail assembly.

In some optional embodiments, the tent lighting assembly may include the main grow lamp suspended from the first trolley which is disposed about the first rail assembly.

In some optional embodiments, the tent lighting assembly may include a drive motor disposed about the first trolley. The drive motor may drive the at least one wheel contacting the first rail assembly.

In some optional embodiments, the tent lighting assembly may include the first trolley comprising a lower surface having a first mounting hole disposed about the lower surface for connecting the first elongate rigid member to the first trolley.

In some optional embodiments, the tent lighting assembly may include a second rail assembly suspended from the first auxiliary tent roof section. The second rail assembly may further comprise a second trolley disposed about the second rail assembly. The second trolley may include at least one wheel contacting the second rail assembly allowing the second trolley to traverse the second rail assembly.

In some optional embodiments, the tent lighting assembly may include the first auxiliary grow lamp suspended from the second trolley which is disposed about the second rail assembly.

In some optional embodiments, the tent lighting assembly may include the second trolley having a lower extension member for connecting the first elongate rigid member to the second trolley.

In some optional embodiments, the tent lighting assembly may include the first elongate rigid member extending through a first main tent opening defined in the main grow tent and a first auxiliary tent opening defined in the first auxiliary grow tent.

In some optional embodiments, the tent lighting assembly may further comprise a second auxiliary tent, a second auxiliary grow lamp, and a second elongate rigid member. The second auxiliary tent may include a second auxiliary tent roof section and the second auxiliary grow lamp translatably suspended from the second auxiliary tent roof section. The second elongate rigid member may connect the main grow lamp to the second auxiliary grow lamp such that the second auxiliary grow lamp translates with the main grow lamp. Finally, the main tent may be positioned between the first auxiliary tent and the second auxiliary tent.

In some optional embodiments, the tent lighting assembly may include the second auxiliary tent roof section comprising a third rail assembly.

In some optional embodiments, the tent lighting assembly may include the third rail assembly suspended from the second auxiliary roof section. The third rail assembly may further comprise a third trolley disposed about the third rail assembly. The third trolley may include at least one wheel contacting the third rail assembly allowing the third trolley to traverse the third rail assembly.

In some optional embodiments, the tent lighting assembly may include the second auxiliary grow lamp suspended from the third trolley, which is disposed about the third rail assembly.

In some optional embodiments, the tent lighting assembly may include the main tent roof section, which comprises a first rail assembly. The first rail assembly may further comprise a first trolley disposed about the first rail assembly. The first trolley may include at least one wheel contacting the first rail assembly allowing the first trolley to traverse the first rail assembly. The first trolley may also include a lower surface having a first mounting hole disposed about the lower surface for connecting the first elongate rigid member to the first trolley. The first trolley may yet further include a second mounting hole disposed about the lower surface for connecting the second elongate rigid member to the first trolley.

In some optional embodiments, the tent lighting assembly may include the third trolley comprising a lower extension member for connecting the second elongate rigid member to the third trolley.

In some optional embodiments, the tent lighting assembly may include the second elongate rigid member which extends through a second main tent opening defined in the main grow tent and a second auxiliary tent opening defined in the second auxiliary grow tent.

Briefly, the present invention also relates, in one optional embodiment, to a method for traversing a plurality of grow lamps within a plurality of grow tents. The method may comprise the steps of (1) providing a main grow tent having a main grow tent roof section, (2) suspending a main grow lamp from the main grow tent roof section, (3) providing a first auxiliary grow tent having a first auxiliary tent roof section, (4) suspending a first auxiliary grow lamp from the first auxiliary tent roof section, (5) disposing a first elongate rigid member through a first main tent opening defined in the main grow tent and a first auxiliary tent opening defined in the first auxiliary grow tent, (6) connecting the first elongate rigid member from the main grow lamp to the first auxiliary grow lamp, and (7) controllably driving a drive motor such that the first auxiliary grow lamp translates with the main grow lamp.

In some optional embodiments, the method may further comprise providing a second auxiliary grow tent having a second auxiliary tent roof section. The method may include suspending a second auxiliary grow lamp from the second auxiliary tent roof section, disposing a second elongate rigid member through a second main tent opening defined in the main grow tent and a second auxiliary tent opening defined in the second auxiliary grow tent, connecting the second elongate rigid member from the main grow lamp to the second auxiliary grow lamp, and controllably driving a drive motor such that the second auxiliary grow lamp translates with the main grow lamp and first auxiliary grow lamp.

DETAILED DESCRIPTION OF THE INVENTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, one or more sections of hooks and corresponding one or more sections of loops, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
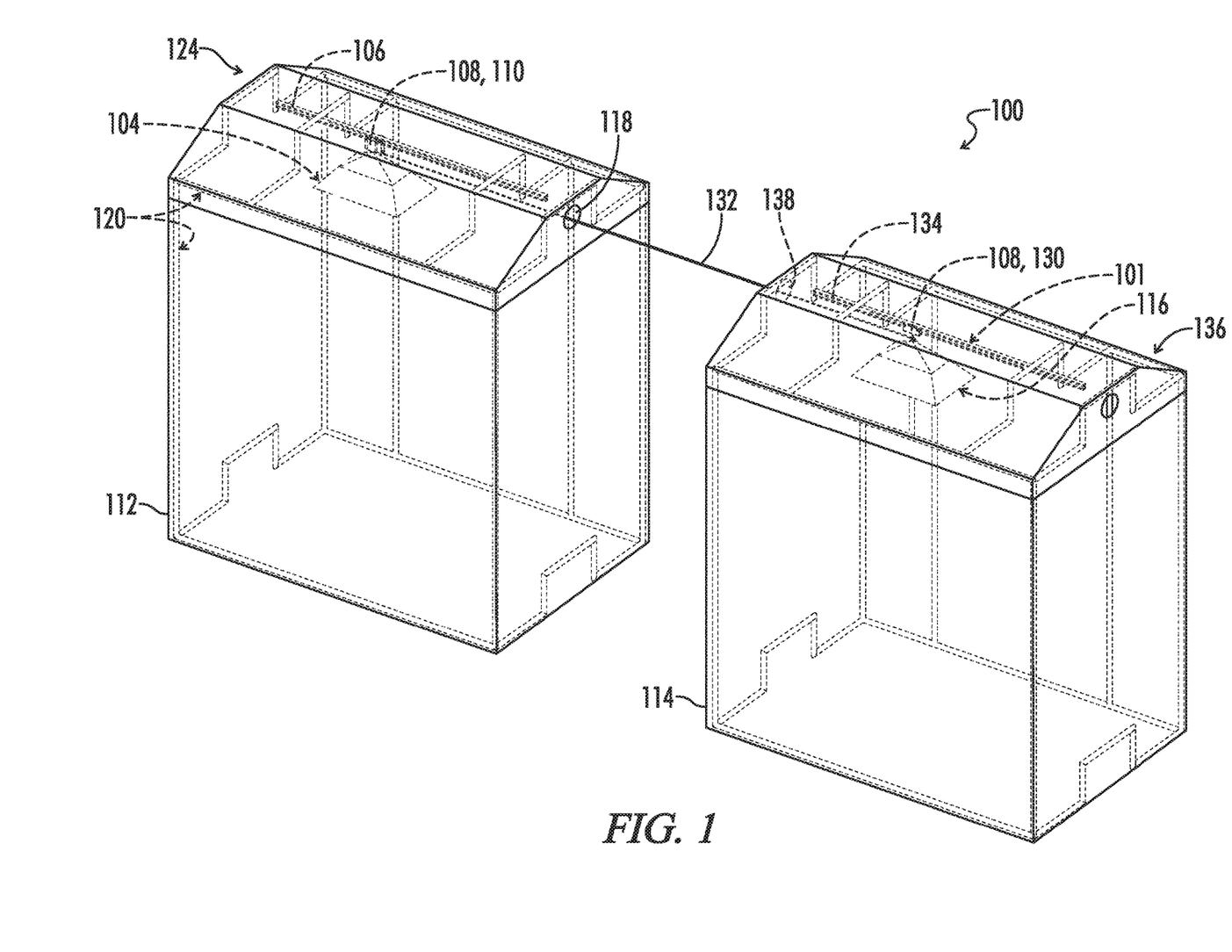
FIG. 1 is a front elevation view of a plant growing system.

FIG. 1 generally depicts a plant growing assembly 100 which may be used for growing plants. In some embodiments, the plant growing assembly may include an indoor greenhouse. The plant growing assembly 100 may include a lighting system 101 which may include a main grow lamp 104 translatably mounted to a rail assembly 106. A trolley 108 may be disposed about the rail assembly 106 which allows the trolley to traverse the rail assembly. In some embodiments, a drive motor 110 may be disposed about the trolley 108. The drive motor 110 may drive the main grow lamp 104 back and forth on the rail assembly 106 to provide more efficient use of the light produced by the grow lamp. Better plant yields can be expected due to the use of this plant growing assembly 100.

In some embodiments, a main tent 112 and an auxiliary tent 114 may be used together with the lighting system 101. The lighting system may include an auxiliary grow lamp 116 connected on one or both sides of the main grow lamp 104. When the lighting system 101 includes one or more of these auxiliary grow lamps 116, the drive motor 110 connected to the main grow lamp 104 is sufficient to drive the one or more auxiliary grow lamps 116.

The plant growing assembly 100 with the lighting system 101, allows for a user to upgrade or downgrade the system as desired. Prior to the current application, the space in which the system could be upgraded or downgraded was a physical room designated as a growing room or a single growing tent large enough to accommodate the upgrades.

Referring to FIG. 1, a plant growing assembly 100 may include a main grow lamp 104 housed within a main grow tent 112. The main grow lamp 104 may be connected to the rail assembly 106, which may be suspended from the top of the main grow tent 112 in any appropriate manner. The main grow tent 112 may be of any appropriate shape and size. In some embodiments, the main grow tent 112 may be 6 feet long by 4 feet wide and 7 feet tall. Additionally, auxiliary tents may be the same dimensions, or may be of different dimensions.

The main grow tent 112 may include at least one opening 118 defined in the main grow tent. In some embodiments, the main grow tent 112 may include openings 118 defined on opposite sides of the main grow tent. The openings 118 may include open holes in the main grow tent 112. The openings 118, however, may further include a flap, a sleeve, and the like, which may cover the opening. The flap may be configured to fully and/or partially close the opening 118 using any appropriate fastener, such as a zipper, buttons, hook and loop fasteners, a drawstring, and the like.

Figure 2:
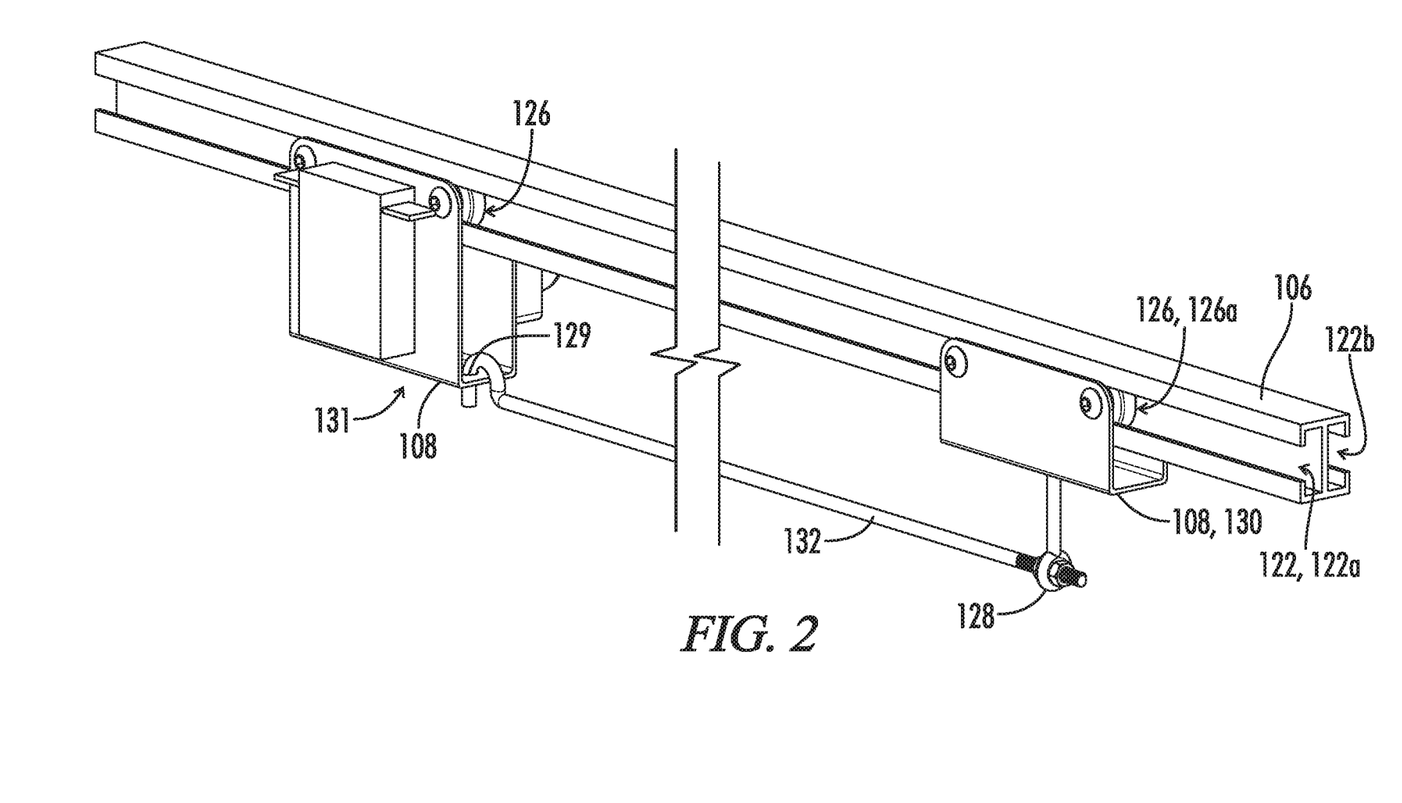
FIG. 2 is a front elevation view of a rail assembly and associated trolleys.

Turning to FIGS. 1 and 2, the main grow tent 112 may further include a tent frame 120. In some embodiments, the tent frame may include a main tent roof section 124. The main tent roof section 124 may be configured to allow the rail assembly 106 to be suspended from the tent roof section. Brackets, hooks, channels, and other fasteners may be attached to or formed with the main tent roof section 124 to mount the rail assembly 106 in place. In some embodiments, the main tent roof section 124 may include several transverse members which connect opposing sides of the frame 120. The transverse members may allow the rail assembly 106 to be suspended from the main tent roof section 124.

The main tent roof section 124 may be pitched or dome shaped. The shape of the roof section 124 may allow for light and/or heat to be reflected from the top of the grow tent 112 back on the plants or the interior of the tent in general. In some embodiments, the tent material may be made of reflective and/or insulative material. The reflective and/or insulative material may allow for light and/or heat to be reflected from the grow tent covering material back into the interior of the tent 112. In embodiments including the tent material made of a reflective and/or insulative material, this dome shaped or pitched roof section 124 in conjunction with the reflective and/or insulative material may reflect light and/or trap heat within the grow tent 112.

Figure 3:
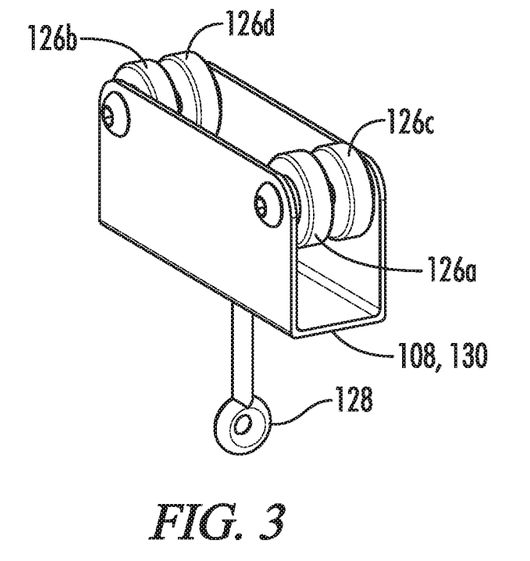
FIG. 3 is a front elevation view of a trolley.
Figure 4:
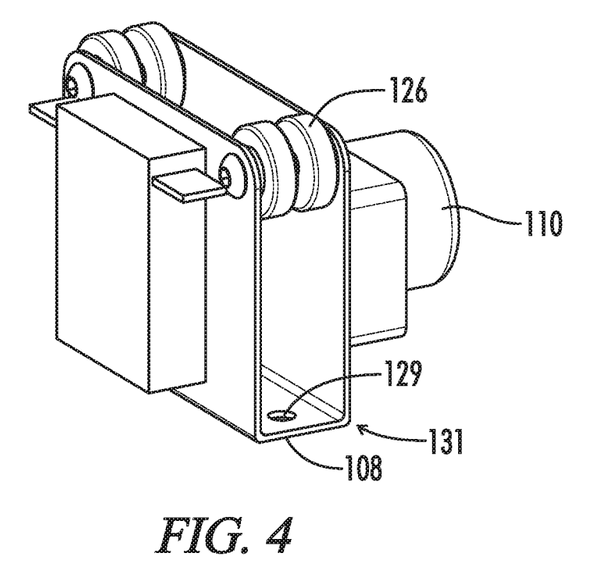
FIG. 4 is a front elevation view of a second trolley containing a drive motor.

As shown in FIGS. 2-4, the rail assembly 106 may include a trolley 108 disposed about the rail assembly. In some embodiments, the trolley 108 may be retained in a channel 122 that is formed in the rail assembly 106. The channel 122 is configured to provide a track for the trolley 108 to travel within. The trolley 108 may include at least one wheel 126 which is rotatingly connected to the trolley and may be disposed within the channel 122 of the rail assembly 106. In some embodiments, the trolley 108 may include 4 wheels 126a, 126b, 126c, 126d. The rail assembly 106 may include 2 channels 122a, 122b on each side of the rail. The trolley 108 may be U-shaped with 2 sets of the 4 wheels 126a, 126b, 126c, 126d on opposing sides. One set of wheels 126a, 126b is disposed within one side of the channel 122a while the other set of wheels 126c, 126d is disposed about the other side of the channel 122b.

In some embodiments, the trolley 108 may include a lower extension member 128. The lower extension member 128 may include, but is not limited to, an eyebolt, hook, fastener, latch, lock, or the like for suspending a grow lamp 104, 116 or for connecting an elongate rigid connecting rod 132. In another embodiment, the trolley 108 may include at least one mounting hole 129 on the lower surface 131 of the trolley which allows for connecting fasteners or other connectors used in the lighting system 101, for example, the elongate rigid connecting rod 132.

A trolley 108 may also include a drive motor 110 mounted to the trolley to drive at least one wheel 126 and thus drive the trolley along the channel 122 of the rail assembly 106 (FIG. 4). In a preferred embodiment, the main grow tent 112 utilizes a drive motor 110 mounted to a first trolley 108 (FIG. 1). The first trolley 108 is driven along the rail assembly with the main grow lamp 104 suspended therefrom. The main grow lamp 104 may be suspended from the hanger 128 or may be suspended from the mounting hole 129. Likewise, the main grow lamp 104 may be suspended from a connector or other fastener mounted to the hanger 128 or mounting hole 129.

In comparison to the main grow tent 112, an auxiliary tent 114 may utilize a second trolley 130 which lacks a drive motor 110. The first trolley 108 and second trolley 130 may be connected, so that the drive provided by the drive motor 110 to the first trolley also drives the second trolley 130 and its associated auxiliary grow lamp 116.

Figure 5:
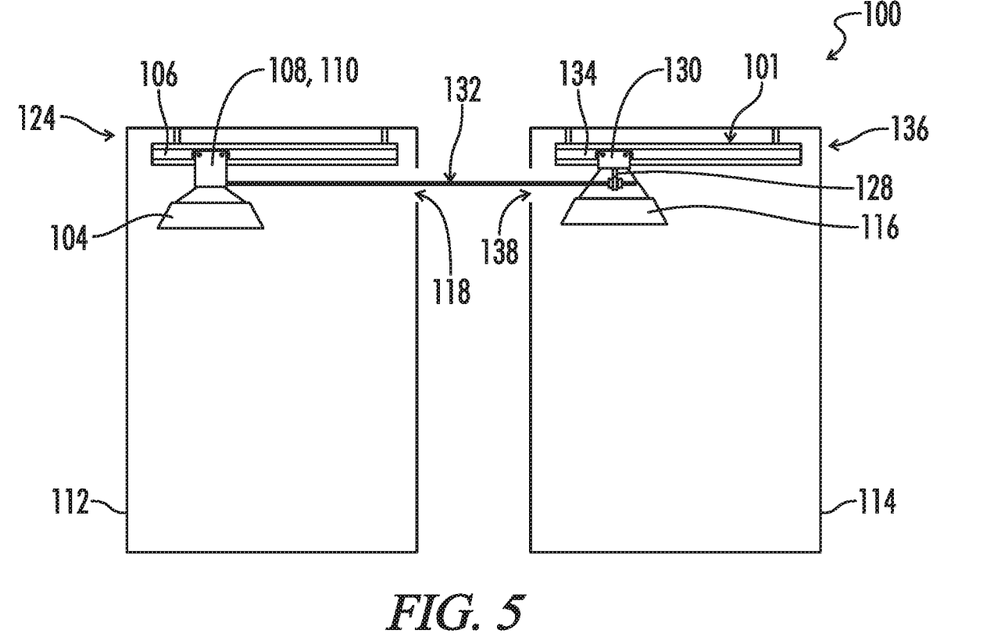
FIG. 5 is a side elevation cross-sectional view of a grow system including a main grow tent and an auxiliary grow tent.
Figure 6:
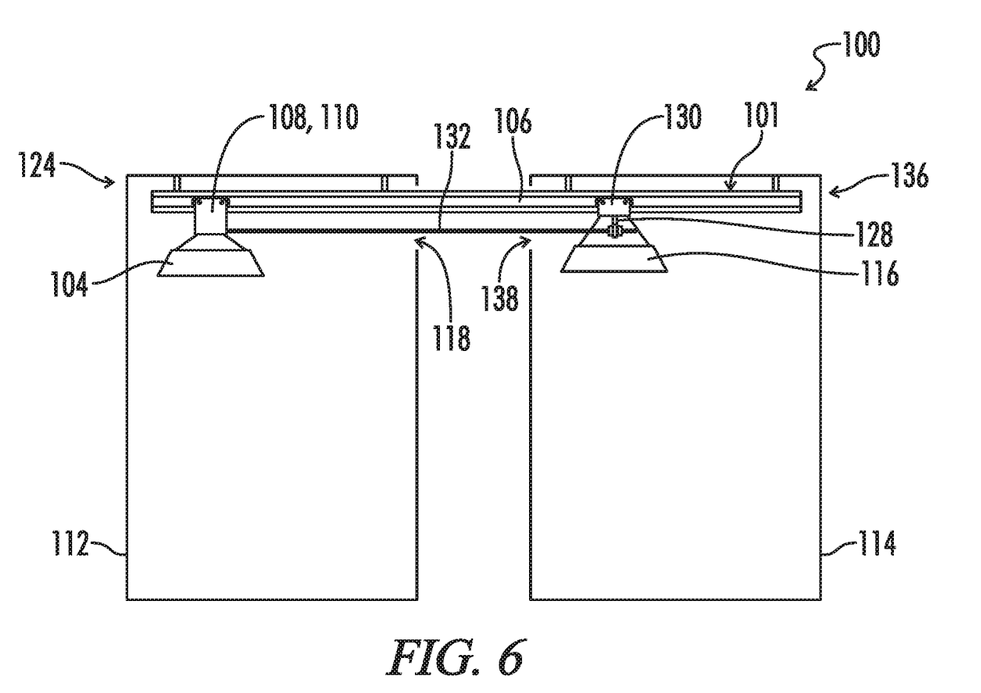
FIG. 6 is a side elevation cross-sectional view of a grow system including a main grow tent, and an auxiliary grow tent. The embodiment including a main railing section extending between the two grow tents.

With reference to FIGS. 1, 5, and 6, a user may increase the available grow space without removing the main grow tent 112 in some embodiments. The first auxiliary grow tent 114 may be added to the plant growing assembly 100. The first auxiliary grow tent 114 may be identical to, substantially identical to, or different from the main grow tent 112. Some embodiments may include the first auxiliary grow tent 114 being directly connected to the main grow tent 112. Still other embodiments may include the first auxiliary grow tent 114 standing apart from the main grow tent 112. In such a configuration, a first auxiliary grow lamp 116 may be connected to the main grow lamp 104 via a rigid connecting rod 132. The rigid connecting rod 132 may include a single elongate rigid member of static length. In some embodiments, the rigid connecting rod 132 may include multiple components, which are connected via a rigid connector element. For example, the connecting rod components may be threaded rods that are connected to each other using a threaded coupler nut.

In other embodiments, the rigid connecting rod 132 may include multiple components that may be slidable relative to one another for a set range. In such embodiments, the rod 132 may allow the driven lamp, or main grow lamp 104, to move a farther distance when compared to the first auxiliary grow lamp 116. The multiple components of the rigid connecting rod 132 may collapse a predetermined amount until the first auxiliary grow lamp 116 is then pushed by the rigid connecting rod. Similarly, the multiple components of the rigid connecting rod 132 may extend relative to each other a predetermined amount until the first auxiliary grow lamp 116 is then pulled by the rigid connecting rod.

As shown in FIG. 5, the main grow lamp 104 may be suspended from a main rail assembly 106, and the first auxiliary grow lamp 116 may be suspended from a second rail assembly 134. Similar to the main tent 112, the first auxiliary tent 114 may include a first auxiliary roof section 136 from which the first auxiliary rail assembly 134 may be suspended. Likewise, the second rail assembly 134 may include a second trolley 130. The auxiliary grow lamp 116 may be suspended from the second rail assembly 134 via the second trolley 130, thus suspending the auxiliary grow lamp from the auxiliary tent roof section 136. In this embodiment, each grow tent 112, 114 may include separate rail assemblies 106, 134.

FIG. 6 shows an alternative embodiment in which both the main grow lamp 104 and the first auxiliary grow lamp 116 may be suspended from a single main rail assembly 106. The main rail assembly 106 may be suspended from the top of both the main grow tent 112 and the first auxiliary grow tent 114 in any appropriate manner.

In both embodiments shown in FIGS. 5 and 6, the grow lamps 104, 116 may be moved under the power of the drive motor 110. The main trolley 108 and its associated drive motor 110 may be rigidly connected to the second trolley 130 via the connecting rod 132. Thus, the drive motor 110 drives both the main grow lamp 104 and the auxiliary grow lamp 116. The main trolley 108 may include a mounting hole 129 disposed in the lower surface of the trolley. The connecting rod 132 may be connected to the mounting hole 129 using appropriate means. In some embodiments, the connecting rod 132 may be connected via a hook, clasp, carabiner, anchor, fastener, clamp, and the like. The second trolley 130 may include a lower extension member 128 which allows the connecting rod 132 to be attached to the second trolley. In one embodiment, the lower extension member 128 may be an eyebolt wherein the connecting rod 132 is disposed within the void of the eyebolt and secured using two nuts on either side of the eyebolt.

This two tent configuration may allow for a user to continue using the main grow tent 112 while still adding capacity to the plant growing assembly 100. One or more openings 118, 138 defined in the main grow tent 112 and the auxiliary grow tent 114 may allow components of the lighting system to pass through the wall of the respective grow tents. For instance, in FIG. 6, the rigid connecting rod 132 may pass through the openings 118, 132. As for the embodiment in FIG. 6, both the rigid connecting rod 132 and the main rail assembly 106 may pass through the openings 118, 138. In embodiments including flaps and/or sleeves, the openings 118, 138 may be at least partially closed to aid in controlling the environment within the tents 112, 114. This at least partial closure may allow for easier control of humidity, light, temperature, and the like.

A benefit of the two grow tent configuration shown in FIGS. 5 and 6 may be that different plants having different light intensity and light duration requirements may be housed in different grow tents 112, 114. For instance, a plant that would typically require full sunlight in natural conditions may be stored in the main grow tent 112 with the main grow lamp 104 having a high light intensity and long light duration compared to the first auxiliary grow lamp 116. Then, a plant that would typically require only partial sunlight in natural conditions may be stored in the first auxiliary grow tent 114 with the first auxiliary grow lamp 116 having a low light intensity and short light duration compared to the main grow lamp 104.

Figure 7:
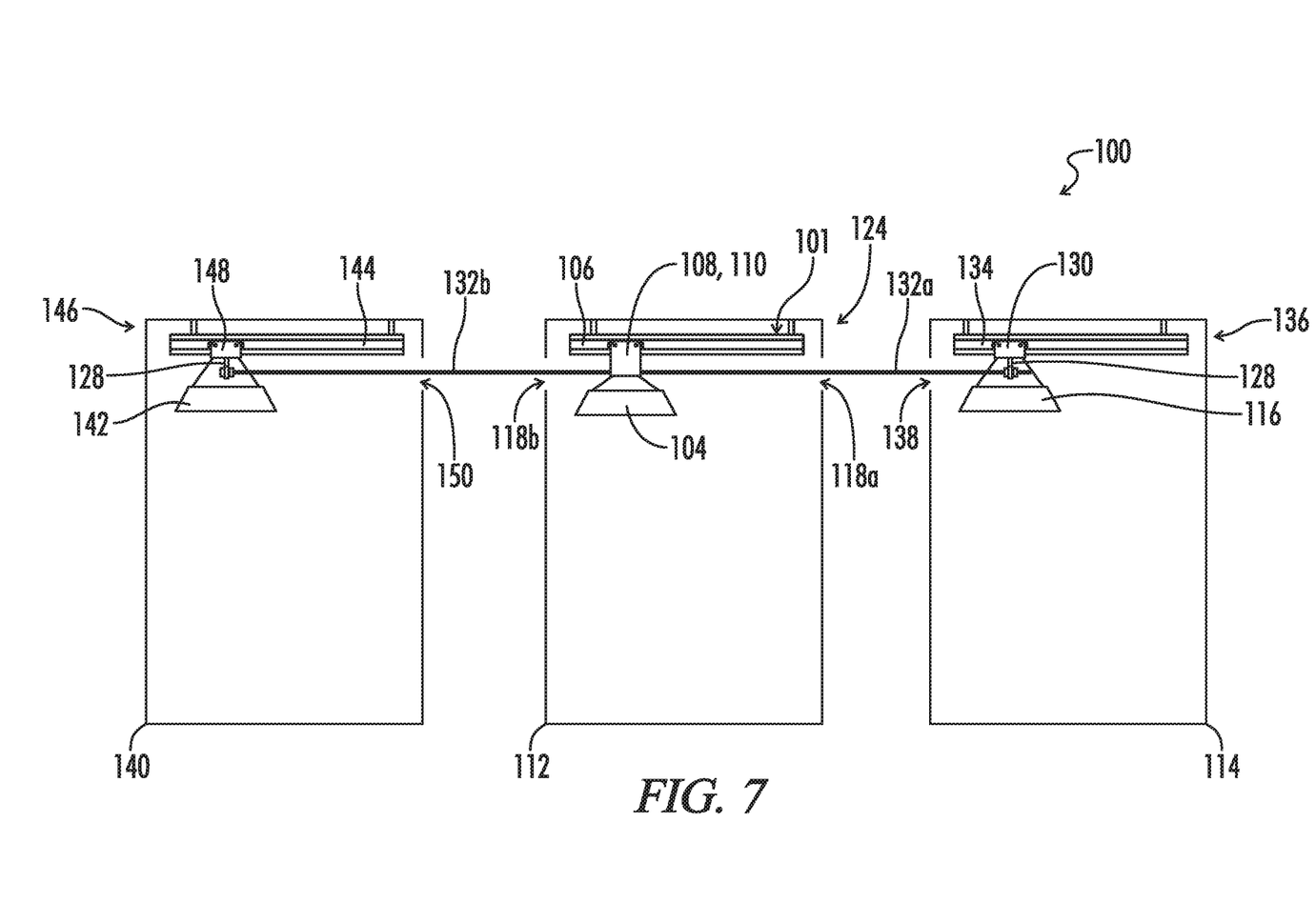
FIG. 7 is a side elevation cross-sectional view of a grow system including a main grow tent, a first auxiliary grow tent, and a second auxiliary grow tent.
Figure 8:
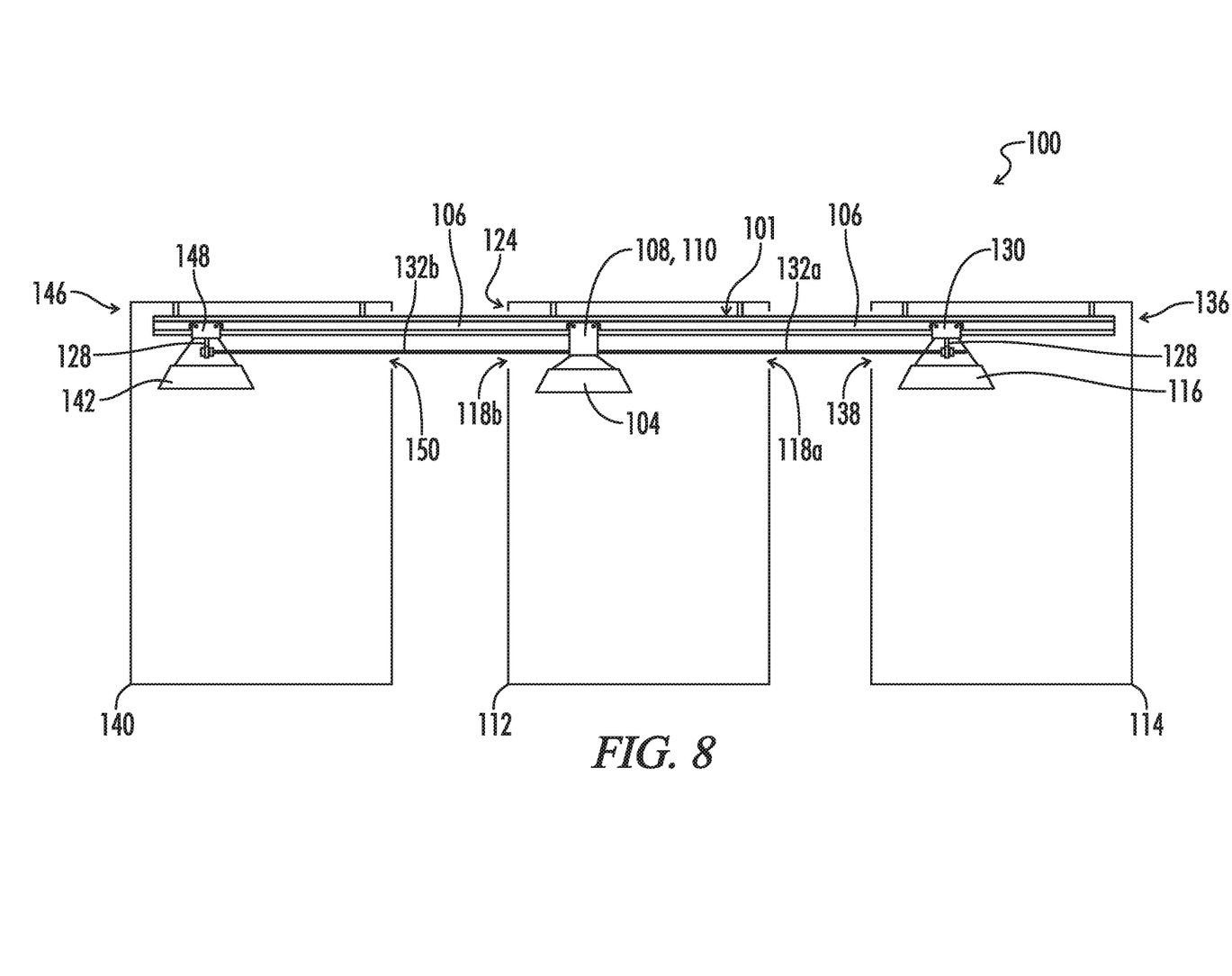
FIG. 8 is a side elevation cross-sectional view of a grow system including a main grow tent, a first auxiliary grow tent, and a second auxiliary grow tent. The embodiment including a main railing section extending between the three grow tents.
Figure 9:
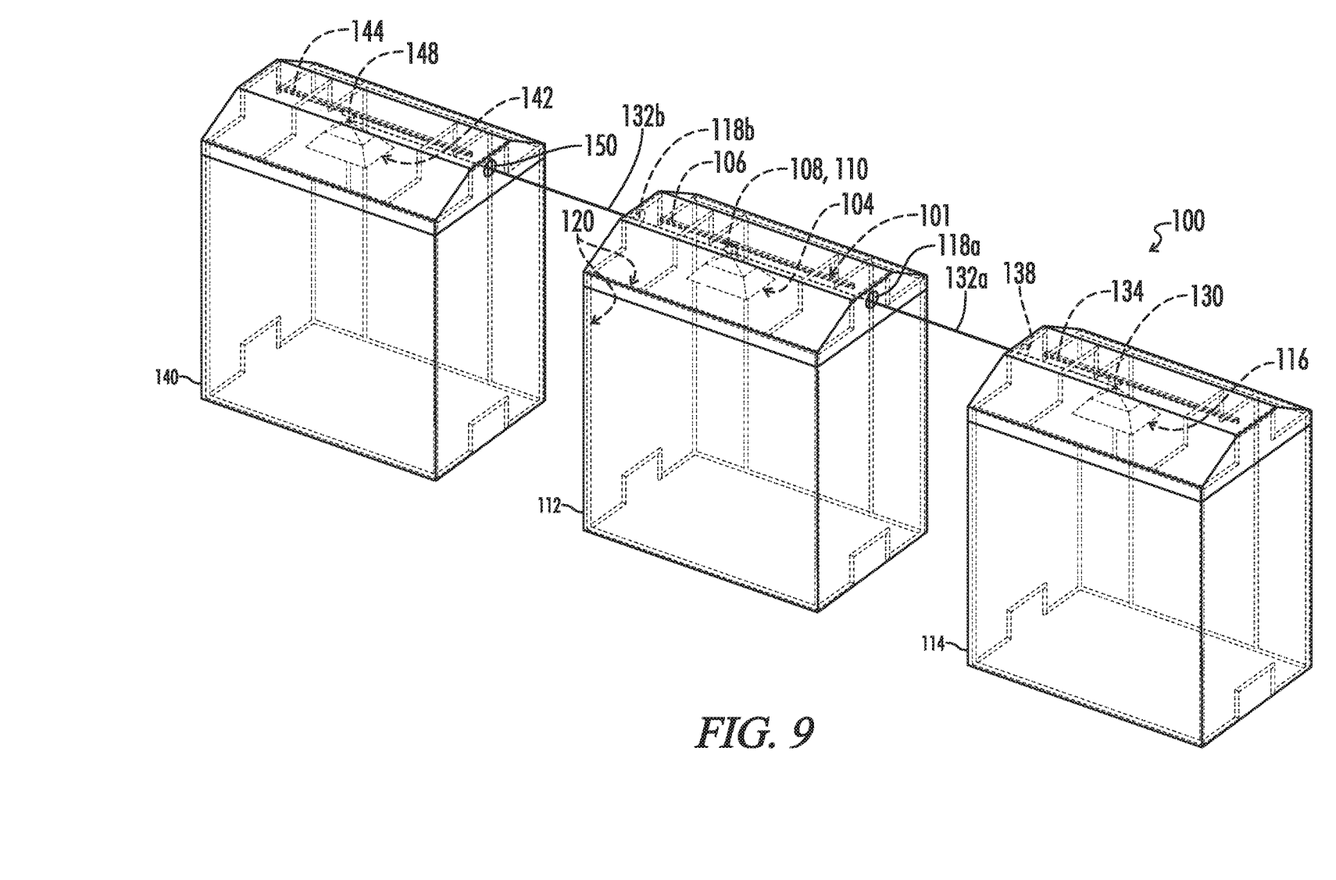
FIG. 9 is a front elevation view of a plant growing system with three grow tents.

With reference now to FIGS. 7, 8, and 9 a user may triple the available grow space without removing the main grow tent 112 in some embodiments. A first auxiliary grow tent 114 and a second auxiliary grow tent 140 may be added to the plant growing assembly 100. The second auxiliary grow tent 140 may be identical to, substantially identical to, or different from the main grow tent 112 and the first auxiliary grow tent 114. Some embodiments may include the second auxiliary grow tent 140 being directly connected to the main grow tent 112. Still other embodiments may include the second auxiliary grow tent 140 standing apart from the main grow tent 112. In a preferred embodiment, the main grow tent 112 may be positioned between the first auxiliary grow tent 114 and the second auxiliary grow tent 140. In such a configuration, a second auxiliary grow lamp 142 may be connected to the main grow lamp 104 via a rigid connecting rod 132. The rigid connecting rod 132 may be a single piece or may be multiple components as discussed above. The multiple components may also be connected via a connector as discussed previously. Further, the connecting rod 132 may be collapsible and expandable as discussed above with reference to the rigid connecting rod connecting the first auxiliary grow lamp 116 to the main grow lamp 104.

As shown in FIG. 7, the main grow lamp 104 may be suspended from a main rail assembly 106, the first auxiliary grow lamp 116 may be suspended from a second rail assembly 134, and the second auxiliary grow lamp 142 may be suspended from a third rail assembly 144. The third rail assembly 144 may be suspended from the second auxiliary roof section 146 of the second auxiliary grow tent 140 in any appropriate manner. The second rail assembly 134 may include a second trolley 130 from which the first auxiliary grow lamp 116 is suspended. The third rail assembly 144 may include a third trolley 148 from which the second auxiliary grow lamp 142 is suspended. As described previously, the first trolley 108, second trolley 130, and third trolley 148, may each include at least one wheel 126 contacting a respective rail assembly 106, 134, 144 allowing the trolley to traverse the respective rail assembly along the rail's channel 122.

FIG. 8 shows an alternative embodiment in which the main grow lamp 104, the first auxiliary grow lamp 116, and the second auxiliary grow lamp 142 may be suspended from the main rail assembly 106. The main rail assembly 106 may be suspended from the main grow tent roof section 124, the first auxiliary grow tent roof section 136, and the second auxiliary grow tent roof section 146 in any appropriate manner.

In both embodiments shown in FIGS. 7 and 8, the grow lamps 104, 116, 142 may be moved under the power of the drive motor 110 connected to the first trolley 108. The first trolley 108 may be rigidly connected to the second and third trolleys 130, 148 via connecting rods 132 so that when the first trolley is driven along the rail assembly 106 by the drive motor 110 the second and third trolleys are also driven along the respective rail assemblies 134, 144. In this configuration, the elongate connecting rods 132 may include a first and second rod 132a, 132b, wherein the first connecting rod 132a connects the first trolley 108 to the second trolley 130, and the second connecting rod 132b connects the first trolley 108 to the third trolley 148. Thus, the main grow lamp 104, first auxiliary grow lamp 116, and second auxiliary grow lamp 142 are driven together via the drive motor 110. In some embodiments, the rigid connecting rods 132 may be single elongate members or may be multiple components that include multiple elongate members connected to each other via a connector element such as, but not limited to, a coupler nut. Depicted in FIG. 7, the first elongate rigid member 132a may extend through a first main tent opening 118a and through a first auxiliary tent opening 138. Likewise, the second elongate rigid member 132b may extend through a second main tent opening 118b and through a second auxiliary tent opening 150. The openings 118a, 118b, 138, 150 allow the rigid members 132a, 132b to extend from one trolley 108 to another trolley 130, 148 so that the grow lamps 104, 116, 142 may translate in a coordinated fashion while minimizing the exposure of the tent environment to the exterior environment.

As depicted in FIG. 8, another embodiment may include both the rigid connecting rod 132 and the main rail assembly 106 passing through the openings 118a, 118b, 138, 150. The main rail assembly 106 may be suspended from the main tent roof section 124, the first auxiliary tent roof section 136, and the second auxiliary tent roof section 146 by any appropriate means. Each of the grow lamps 104, 116, 142 may be suspended from the main rail assembly 106 via trolleys 108, 130, 148. The trolleys 108, 130, 148 may be connected via connecting rods 132a, 132b so that the grow lamps 104, 116, 142 may translate in a coordinated fashion.

As discussed earlier, the main trolley 108 may include at least one mounting hole 129 disposed in the lower surface of the trolley. In the configuration with two auxiliary tents 114, 140 the main trolley 108 may include at least two mounting holes 129a, 129b disposed in the lower surface of the trolley. The connecting rods 132a, 132b may be connected to the individual mounting holes 129a, 129b using appropriate means. In some embodiments, the connecting rod 132 may be connected via a hook, clasp, carabiner, anchor, fastener, clamp, and the like. The third trolley 130 may include a lower extension member 128 which allows the connecting rod 132 to be attached to the third trolley. In one embodiment, the lower extension member 128 may be an eyebolt wherein the connecting rod 132 is disposed within the void of the eyebolt and secured using two nuts on either side of the eyebolt.

As discussed above, the main grow tent 112 may be retained while still adding capacity to the plant growing assembly 100. All three grow tents 112, 114, 140 may include openings 118, 138, 150 defined in the respective grow tents. The openings 118, 138, 150 may be of any appropriate size and may include flaps and/or sleeves. The openings 118, 138, 150 may be at least partially closed as mentioned above. In some embodiments, the openings 118, 138, 150 may be at least 12 inches in height. In other embodiments, the openings 118, 138, 150 may be 6 inches in height. In yet other embodiments, the openings 118, 138, 150 may be 2 inches in height. In another embodiment, the openings 118, 138, 150 may be only 1 inch in height.

A particular benefit to the three grow tent configuration shown in FIGS. 7 and 8 may be that plants may be housed in each respective grow tent based on the particular stage of growth of the plants. Plants typically undergo three growth stages: starting stage, vegetative stage, and bloom stage. For indoor growing systems, the plants require different amounts of light intensity and light duration for each of the three stages. In the plant growing assembly 100 shown in FIGS. 7 and 8, it would be possible for a user to house plants growing at all three stages by placing, for instance, the starting stage plants in the first auxiliary grow tent 114, the vegetative stage plants in the main grow tent 112, and the bloom stage plants in the second auxiliary grow tent 140. With this configuration, different strength lights could be used for the grow lamps 104, 116, 142 to provide different light intensity in each of the respective grow tents 112, 114, 140. Similarly, the grow lamps 104, 116, 142 could each be set on different timers so as to provide a different light duration for each of the respective grow tents 112, 114, 140.

Of course, further embodiments including more than three grow tents are contemplated. A more powerful drive motor 110 may be required at a given threshold when adding auxiliary lamps connected by rigid connecting rods 132. The end tents may be without openings 118 on the side of the tents that are not adjacent another tent. Alternatively, all the tents may include openings 118 on both sides, and the outside openings on the outer tents may simply be fastened shut.

In many embodiments, the grow tents 112, 114, 140 may be considered light moving grow tents in that they may be specifically adapted to function with a light moving apparatus. In such embodiments, the two to three grow lights move on one or more light mover rails with each grow light in its respective tent. An example of this configuration may include one grow light moving in one tent for a vegetative phase of plant growth and one to two more grow lights being in respective grow tents and moving in a connected fashion to the one grow light in the vegetative phase tent. The one to two additional connected grow lights may be used for a bloom phase of plant growth in their respective tents. Each light mover grow tent may be expandable to attach to an adjacent respective light mover grow tent. The light mover grow tents may further be specifically adapted to allow for desired connectivity to one another for multiple lamp and multiple tent growing systems.

This invention also contemplates a method for using the plant growing assembly 100 where the method for traversing a plurality of grow lamps within a plurality of grow tents comprises the method of first providing a main grow tent 112 having a main grow tent roof section 124. A main grow lamp 104 may be suspended from the main grow tent roof section 124. A first auxiliary grow tent 114 may be provided where the auxiliary grow tent has a first auxiliary tent roof section 136. A first auxiliary grow lamp 116 may be suspended from the first auxiliary tent roof section 136. An elongate rigid member 132 for connecting the main grow lamp 104 to the first auxiliary grow lamp 116 may be disposed through a first main tent opening 118, defined in the main grow tent 112, and through a first auxiliary tent opening 138, defined in the first auxiliary grow tent 114. The elongate rigid member 132 may then be connected to the main grow lamp 104 and the first auxiliary grow lamp 116. Finally, a drive motor 110 may be used to drive the main grow lamp 104 such that the first auxiliary grow lamp 116 is controllably translated with the main grow lamp.

In another embodiment, the method may comprise providing a second auxiliary grow tent 140 having a second auxiliary roof tent section 146. A second auxiliary grow lamp 142 may be suspended from the second auxiliary roof tent section 146. A second elongate rigid member 132b may be disposed through a second main tent opening 118b, defined in the main grow tent 112, and through a second auxiliary tent opening 150, defined in the second auxiliary tent 140. The second elongate rigid member 132b may be connected to the main grow lamp 104 and the second auxiliary grow lamp 142. The drive motor 110 may be used to drive the main grow lamp 104 such that the second auxiliary grow lamp 116 is controllably translated with the main grow lamp.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A tent lighting assembly for growing plants, the tent lighting assembly comprising:
    a main tent including:
        a main tent roof section;
        a main grow lamp translatably suspended from the main tent roof section; and
        a drive motor configured to translate the main grow lamp;
    a first auxiliary tent including:
        a first auxiliary tent roof section; and
        a first auxiliary grow lamp translatably suspended from the first auxiliary tent roof section; and
    a first elongate rigid member connecting the main grow lamp to the first auxiliary grow lamp such that the first auxiliary grow lamp translates with the main grow lamp.

2. The tent lighting assembly of claim 1, wherein the main tent roof section comprises a first rail assembly, and the first auxiliary tent roof section comprises a second rail assembly.

3. The tent lighting assembly of claim 2, wherein the first rail assembly is suspended from the main tent roof section, the first rail assembly further comprising a first trolley disposed about the first rail assembly, the first trolley including at least one wheel contacting the first rail assembly allowing the first trolley to traverse the first rail assembly.

4. The tent lighting assembly of claim 3, wherein the main grow lamp is suspended from the first trolley disposed about the first rail assembly.

5. The tent lighting assembly of claim 3, wherein the drive motor is disposed about the first trolley, the drive motor driving the at least one wheel contacting the first rail assembly.

6. The tent lighting assembly of claim 5, wherein the first trolley comprises a lower surface having a first mounting hole disposed about the lower surface for connecting the first elongate rigid member to the first trolley.

7. The tent lighting assembly of claim 2, wherein the second rail assembly is suspended from the first auxiliary tent roof section, the second rail assembly further comprising a second trolley disposed about the second rail assembly, the second trolley including at least one wheel contacting the second rail assembly allowing the second trolley to traverse the second rail assembly.

8. The tent lighting assembly of claim 7, wherein the first auxiliary grow lamp is suspended from the second trolley disposed about the second rail assembly.

9. The tent lighting assembly of claim 8, wherein the second trolley comprises a lower extension member for connecting the first elongate rigid member to the second trolley.

10. The tent lighting assembly of claim 1, wherein the first elongate rigid member extends through a first main tent opening defined in the main grow tent and a first auxiliary tent opening defined in the first auxiliary grow tent.

11. The tent lighting assembly of claim 1, further comprising:
    a second auxiliary tent including:
    a second auxiliary tent roof section; and
    a second auxiliary grow lamp translatably suspended from the second auxiliary tent roof section;
    a second elongate rigid member connecting the main grow lamp to the second auxiliary grow lamp such that the second auxiliary grow lamp translates with the main grow lamp; and
    wherein the main tent is positioned between the first auxiliary tent and the second auxiliary tent.

12. The tent lighting assembly of claim 11, wherein the second auxiliary tent roof section comprises a third rail assembly.

13. The tent lighting assembly of claim 12, wherein the third rail assembly is suspended from the second auxiliary roof section, the third rail assembly further comprising a third trolley disposed about the third rail assembly, the third trolley including at least one wheel contacting the third rail assembly allowing the third trolley to traverse the third rail assembly.

14. The tent lighting assembly of claim 13, wherein the second auxiliary grow lamp is suspended from the third trolley disposed about the third rail assembly.

15. The tent lighting assembly of claim 11, wherein the main tent roof section comprises a first rail assembly, the first rail assembly further comprising a first trolley disposed about the first rail assembly, the first trolley including:
    at least one wheel contacting the first rail assembly allowing the first trolley to traverse the first rail assembly;
    a lower surface having a first mounting hole disposed about the lower surface for connecting the first elongate rigid member to the first trolley, and a second mounting hole disposed about the lower surface for connecting the second elongate rigid member to the first trolley.

16. The tent lighting assembly of claim 14, wherein the third trolley comprises a lower extension member for connecting the second elongate rigid member to the third trolley.

17. The tent lighting assembly of claim 13, wherein the second elongate rigid member extends through a second main tent opening defined in the main grow tent and a second auxiliary tent opening defined in the second auxiliary grow tent.

18. A method for traversing a plurality of grow lamps within a plurality of grow tents, the method comprising the steps of:
    Providing a main grow tent having a main grow tent roof section;
    Suspending a main grow lamp from the main grow tent roof section;
    Providing a first auxiliary grow tent having a first auxiliary tent roof section;
    Suspending a first auxiliary grow lamp from the first auxiliary tent roof section;

Disposing a first elongate rigid member through a first main tent opening defined in the main grow tent and a first auxiliary tent opening defined in the first auxiliary grow tent;

Connecting the first elongate rigid member from the main grow lamp to the first auxiliary grow lamp; and Controllably driving a drive motor such that the first auxiliary grow lamp translates with the main grow lamp.

19. The method of claim 18, further comprising:

Providing a second auxiliary grow tent having a second auxiliary tent roof section;

Suspending a second auxiliary grow lamp from the second auxiliary tent roof section;

Disposing a second elongate rigid member through a second main tent opening defined in the main grow tent and a second auxiliary tent opening defined in the second auxiliary grow tent;

Connecting the second elongate rigid member from the main grow lamp to the second auxiliary grow lamp;

Controllably driving a drive motor such that the second auxiliary grow lamp translates with the main grow lamp and first auxiliary grow lamp.

* * * * *